United States Patent
Nelson et al.

(10) Patent No.: US 10,077,933 B2
(45) Date of Patent: Sep. 18, 2018

(54) AIR HOOD

(71) Applicants: Bruce Ian Nelson, Colville, WA (US); Joseph Ray Harold, Colville, WA (US); Roger Bruce Williams, Colville, WA (US)

(72) Inventors: Bruce Ian Nelson, Colville, WA (US); Joseph Ray Harold, Colville, WA (US); Roger Bruce Williams, Colville, WA (US)

(73) Assignee: Colmac Coil Manufacturing, Inc., Colville, WA (US)

( * ) Notice: Subject to any disclaimer, the term of this patent is extended or adjusted under 35 U.S.C. 154(b) by 311 days.

(21) Appl. No.: 14/755,109

(22) Filed: Jun. 30, 2015

(65) Prior Publication Data

US 2017/0003066 A1    Jan. 5, 2017

(51) Int. Cl.
| | |
|---|---|
| F25D 21/06 | (2006.01) |
| F25D 21/08 | (2006.01) |
| F25D 23/02 | (2006.01) |
| F25D 17/06 | (2006.01) |
| F25D 21/04 | (2006.01) |
| B60H 1/00 | (2006.01) |
| F24F 1/00 | (2011.01) |

(52) U.S. Cl.
CPC ........... *F25D 21/08* (2013.01); *F25D 17/067* (2013.01); *F25D 21/04* (2013.01); *F25D 23/028* (2013.01); *B60H 1/00514* (2013.01); *B60H 1/00671* (2013.01); *F24F 1/0007* (2013.01); *F24F 1/0011* (2013.01); *F24F 1/0014* (2013.01); *F25D 2400/32* (2013.01)

(58) Field of Classification Search
CPC ...... F25D 21/08; F25D 23/028; F25D 17/067; F25D 2400/32; F24F 1/0007; F24F 1/0011; F24F 1/0014; B60H 1/00514; B60H 1/00671
See application file for complete search history.

(56) References Cited

U.S. PATENT DOCUMENTS

| | | | | |
|---|---|---|---|---|
| 1,364,894 A | * | 1/1921 | Shurtleff | F28D 1/024 165/54 |
| 2,229,569 A | * | 1/1941 | Hoesel | F25D 21/08 62/264 |
| 4,397,157 A | * | 8/1983 | Keuch | F24F 5/001 165/249 |
| 4,577,467 A | * | 3/1986 | Ibrahim | F25D 21/12 165/146 |
| 4,759,196 A | * | 7/1988 | Davis | F24F 1/0007 454/236 |
| 4,843,839 A | * | 7/1989 | Davis | F24F 1/0007 454/236 |
| 5,009,080 A | * | 4/1991 | Naganuma | A47F 3/0404 454/193 |

(Continued)

*Primary Examiner* — Filip Zec
(74) *Attorney, Agent, or Firm* — Randall Danskin P.S.

(57) ABSTRACT

An air hood is described and which is arranged so as to be mounted on a refrigeration device of conventional design; the air hood is moveable between a first position where the air hood is collapsed and is placed in juxtaposed, covering relation relative to an air intake side of the refrigeration device, and a second position where the air hood is placed into an operational position which places it laterally outwardly relative to the air intake side of the refrigeration device.

14 Claims, 10 Drawing Sheets

(56) References Cited

U.S. PATENT DOCUMENTS

| | | | | |
|---|---|---|---|---|
| 5,050,488 A * | 9/1991 | Beasley | ................ | F24F 1/0007 |
| | | | | 454/321 |
| 8,021,217 B2 * | 9/2011 | Tollar | ..................... | F24F 7/025 |
| | | | | 454/228 |
| 8,621,884 B2 * | 1/2014 | Stammer | ................ | F24F 1/022 |
| | | | | 62/409 |

* cited by examiner

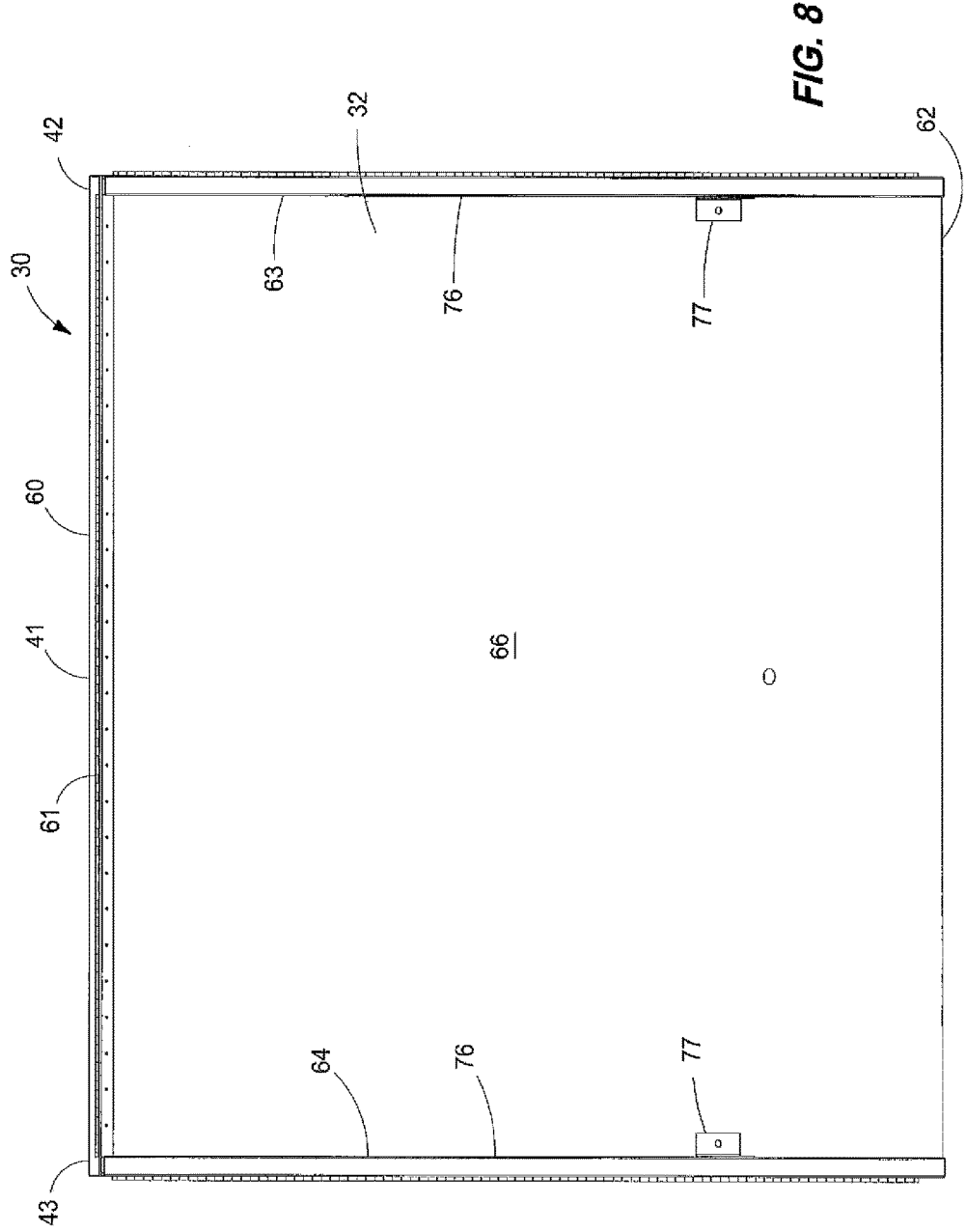

AIR HOOD

TECHNICAL FIELD

The present invention relates to an air hood for use with a refrigeration device, and more specifically to a reconfigurable air hood which is moveable between a first, collapsed position, to a second, operational position; and wherein the air hood, in the first position, facilitates the shipping and installation of the refrigeration device; and when the air hood is located in the second position, the air hood enhances the operation of the refrigeration device upon which it has been installed.

BACKGROUND OF THE INVENTION

Those skilled in the art will recognize that when cooling air to temperatures below freezing, the surfaces of a refrigeration device which may include refrigerant fins and tubes, unavoidably accumulate frost which then must be periodically removed during a defrosting cycle. The defrosting cycle or process is inherently necessary, but some aspects of it is undesirable inasmuch as the defrosting cycle increases the overall refrigeration system power consumption by adding heat to the refrigerated space, and which subsequently must be removed by the refrigeration device or system after the defrosting cycle has been completed.

In an effort to capture this heat which is generated during the defrosting cycle or process, and which is typically lost to the refrigerated space, heretofore, fixed rigid, return air hoods have been mounted on the air entering or air intake side of the refrigeration device. The addition of these rigid defrost hoods has proven to be effective and serves a multitude of purposes including, but not limited to, reducing the amount of defrost heat lost to the refrigerated space; increasing the effectiveness of the defrosting process or cycle; and reducing the duration or elapsed time of the defrosting cycle. One of the detrimental features of employing such rigid, return air hoods is that such refrigeration devices having such prior art assemblies have larger, overall, outside dimensions. These larger outside dimensions of the prior art refrigeration devices often significantly increases the shipping, and freight costs, and also further complicates and renders difficult the handling and rigging of the refrigeration devices when they arrive at their destination and are ready to be installed in their desired location. An air hood design which avoids the detriments associated with the previous prior art practices which have been utilized, heretofore, is the subject matter of the present patent application.

SUMMARY OF THE INVENTION

A first aspect of the present invention relates to an air hood which includes a refrigeration device having an air intake side, and which further encloses refrigeration fins and/or coils, which, when rendered operational, are operable to reduce the temperature of a source of air requiring cooling, and wherein the refrigeration fins and/or coils are located adjacent to the air intake side; a frame mounted on the air intake side of the refrigeration device; and a multiplicity of panels each having a peripheral edge, and wherein each panel is hingedly mounted along at least a portion of their respective peripheral edges to the air intake side of the refrigeration device, and are further moveable from a first position, and where the respective panels, in the first position, are each located in juxtaposed, covering relation relative to the air intake side of the refrigeration device, and further protect the refrigeration fins and/or coils from any damages associated with the shipment and installation of the refrigeration device; and a second position, and where the respective panels, when located in the second position, are moved to a given, laterally, outwardly disposed orientation relative to the refrigeration device, and further matingly cooperate with each other so as to define an operational air hood, which allows access to the air intake side of the refrigeration device, and which further exposes the refrigeration coils and/or fins which are enclosed within the refrigeration device Still another aspect of the present invention relates to an air hood which includes a main body which is attached to a refrigeration device having an air intake side, and wherein the refrigeration device has a refrigeration coil or fins, which are positioned adjacent to the air intake side, and which further periodically require defrosting by undergoing a defrost cycle which generates heat, and wherein the main body of the air hood is reconfigurable, and moveable from a first, collapsed position, and wherein the main body is oriented so as to cover and substantially occlude the air intake side of the refrigeration device so as to reduce an operational size of the refrigeration device, and minimize freight expenses for shipping an operational refrigeration device to an installation site, and which further protects the refrigeration coil or fins during shipment and installation, and wherein the main body, when moved to a second position, forms a rigid operational air hood structure, and which extends laterally, outwardly relative to the refrigeration device, and which further defines a hood opening that allows access to the air intake side of the refrigeration device, and wherein the hood opening has a predetermined cross-sectional dimension, and wherein the main body, when located in the second position, captures, at least in part, a portion of the heat generated during a defrost cycle, and further reduces a duration of the defrost cycle, and additionally increases the efficiency of the defrost cycle.

These and other aspects of the present invention will be discussed in greater detail hereinafter.

BRIEF DESCRIPTION OF THE DRAWINGS

Preferred embodiments of the invention are described below with reference to the following accompanying drawings.

FIG. 8 is a second, side elevation view of an operable air hood of the present invention.

DETAILED DESCRIPTION OF THE PREFERRED EMBODIMENTS

Figure 1:
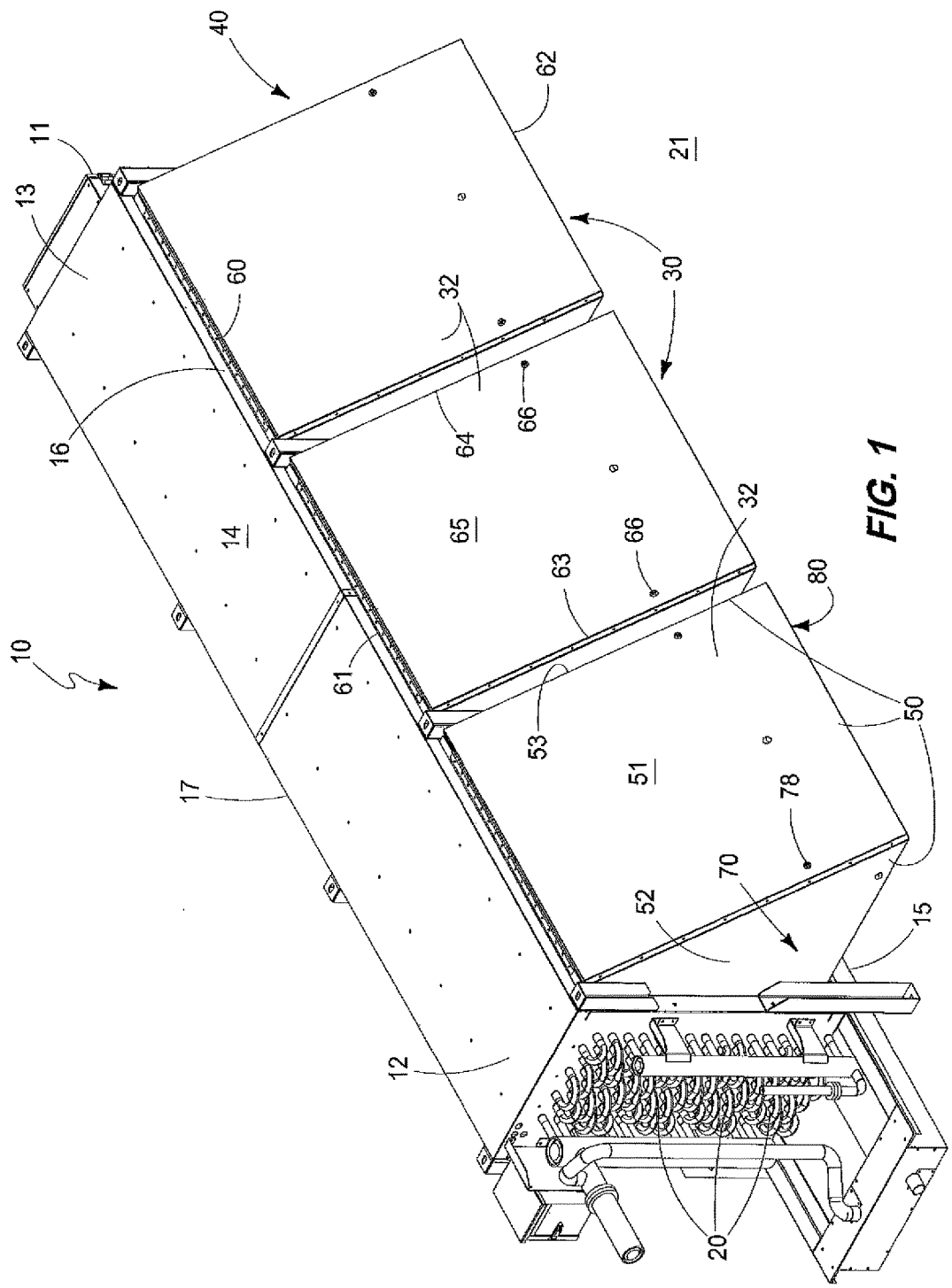
FIG. 1 is a perspective, isometric view of a refrigeration device which employs an operational air hood of the present invention.

This disclosure of the invention is submitted in furtherance of the constitutional purposes of the U.S. Patent Laws "to promote the progress of science and useful arts" (Article 1, Section 8).

As noted earlier in this patent application, the present invention relates to an air hood (as later described), and which is useful when used on, and in combination with a refrigeration device 10 of conventional design. The refrigeration device 10 has a main body 11, with opposite first and second ends 12 and 13, respectively; a top surface 14, and an opposite bottom surface 15. Still further, the refrigeration device has a first, air intake side 16, and an opposite, second side 17. As best seen by reference to FIGS. 1 and 1A, respectively, the refrigeration device 10 has given outside dimensions which vary depending upon the orientation of the air hood as well as will be discussed, below.

Figure 4:
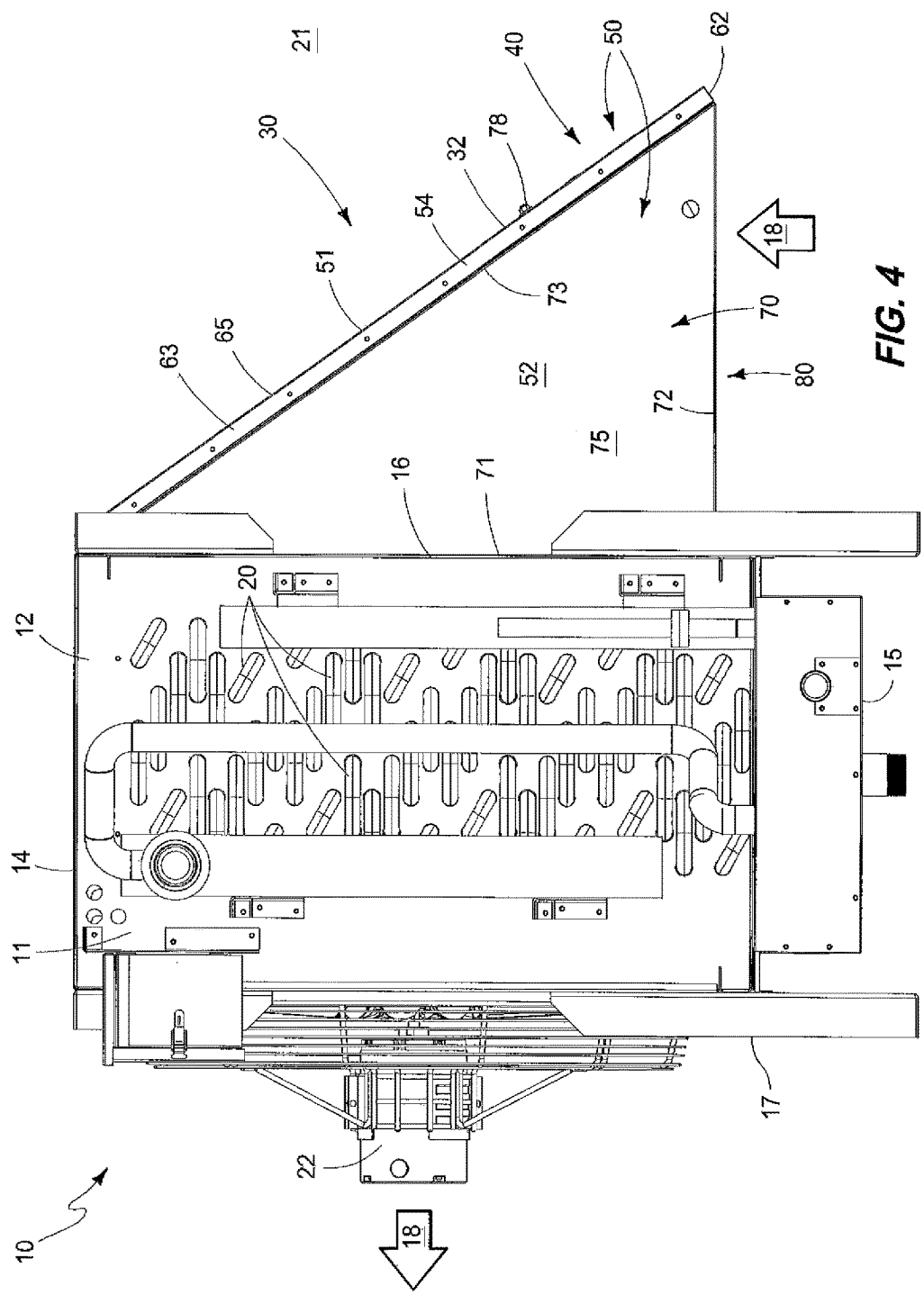
FIG. 4 is an end view of a refrigeration device utilizing an operational air hood of the present invention.

The refrigeration device 10 of the present invention further encloses refrigeration fins or coils, here indicated by the numeral 20, and which, when rendered operational, will reduce the temperature of the source of air 21 requiring cooling. As seen in the drawings (FIG. 4) the refrigeration fins and/or coils 20 are located adjacent to the air intake side 16 of the refrigeration device 10. Still further and as seen in the drawings (FIG. 4), the refrigeration device mounts a fan 22 on the second side 17. The refrigeration device 10 is periodically rendered operable in a defrosting cycle or operation to remove accumulated frost which unavoidably collects or forms on the refrigeration fins and/or tubes 20 during routine operation. The flow of air through the refrigeration device 10 is indicated by the arrows labeled 18 in FIG. 4. This defrosting process or cycle generates heat energy which can enter the space or source of air 21 to be refrigerated, and which is coupled or adjacent to the air intake side 16. As earlier noted, this heat which is generated can cause the problems earlier discussed in this application. The defrosting cycle employed with the refrigeration device 10 has a given time duration, and the present invention is operable to reduce the duration of the defrosting cycle; and further increases the effectiveness of the defrosting cycle when it is employed, as discussed, below.

Figure 1A:
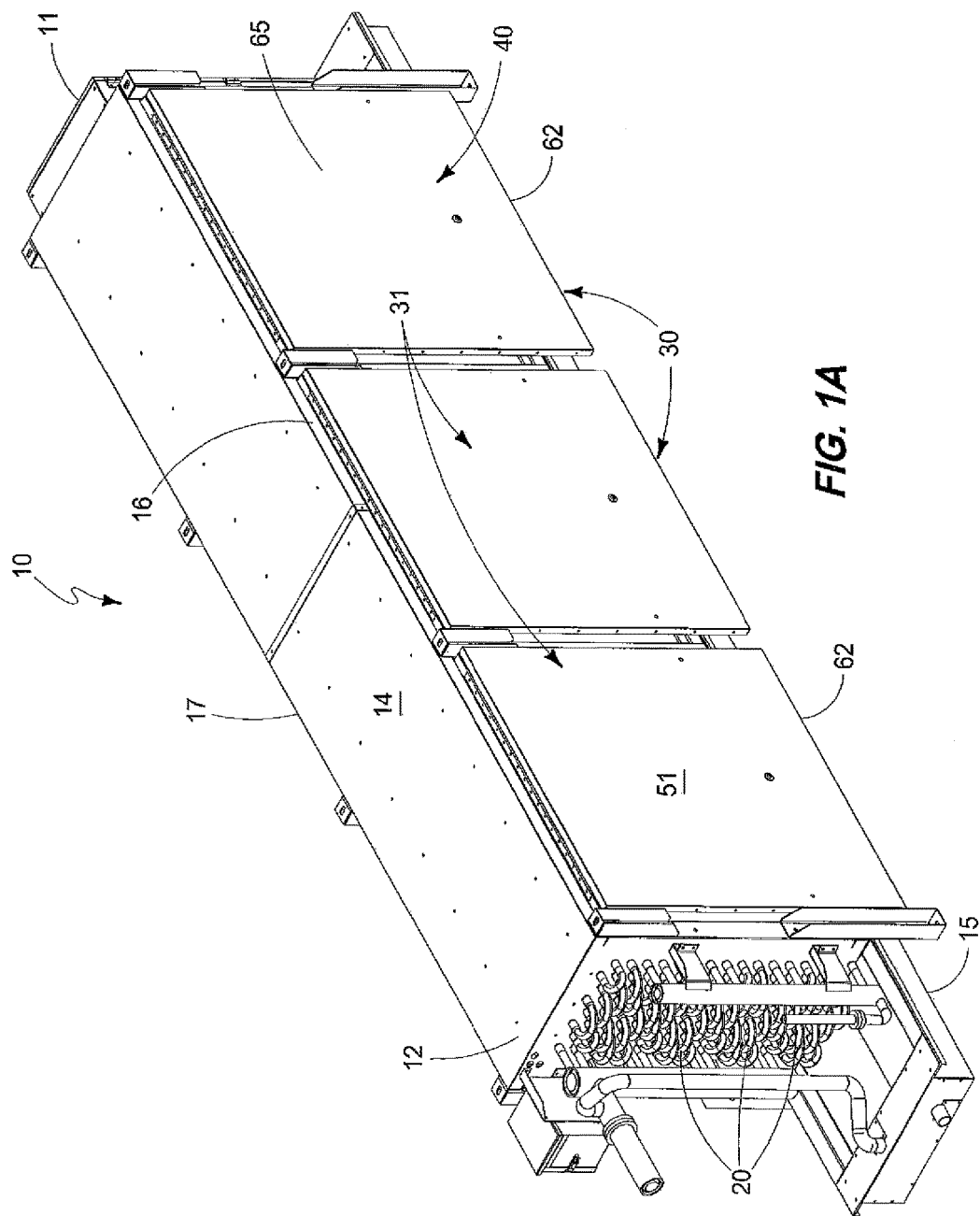
FIG. 1A is a second, perspective, isometric view of a refrigeration device employing the air hood of the present invention, and where the air hood is illustrated in a non-functional, or collapsed orientation.
Figure 2:
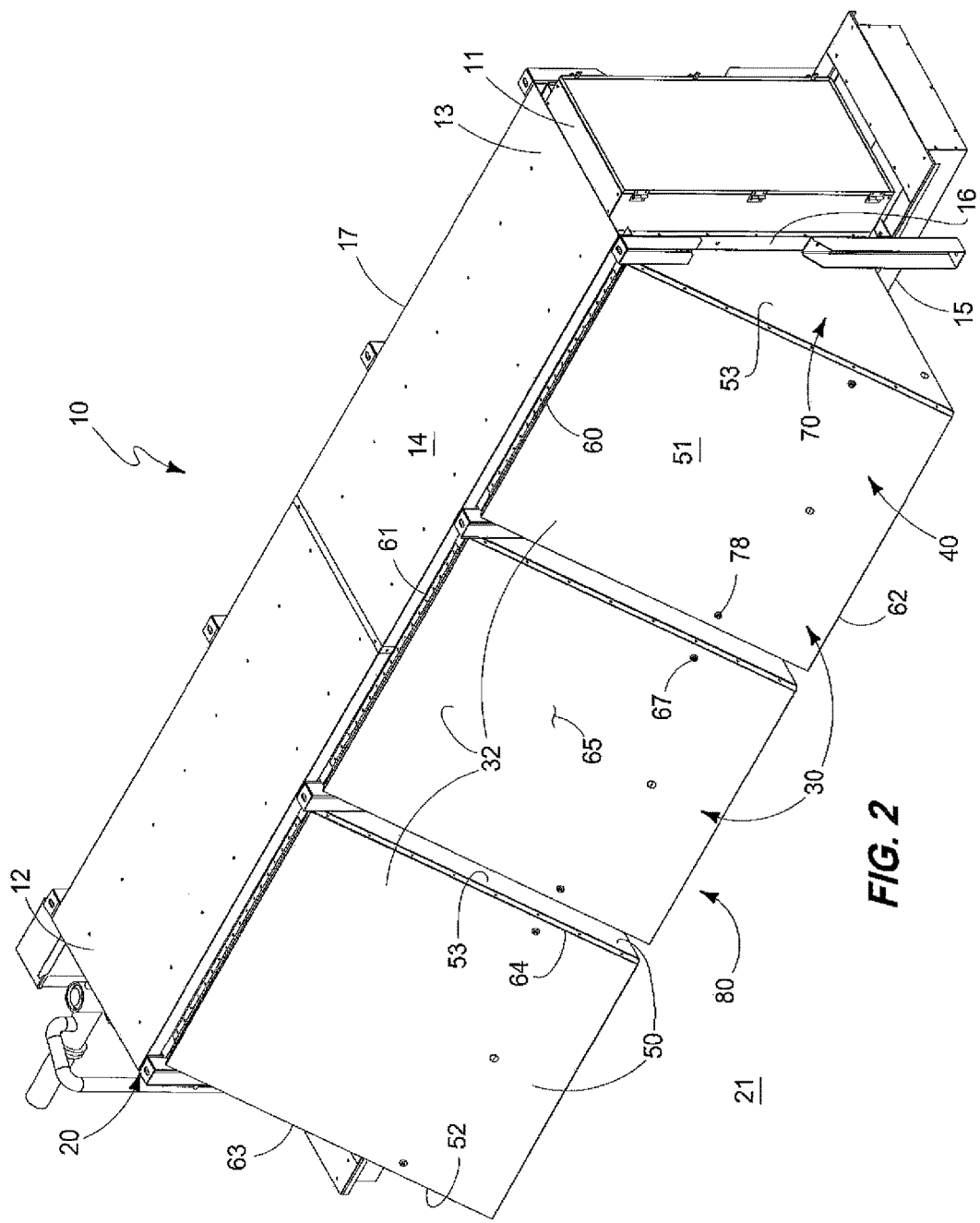
FIG. 2 is another, perspective, isometric view of a refrigeration device employing an operational air hood of the present invention.
Figure 3:
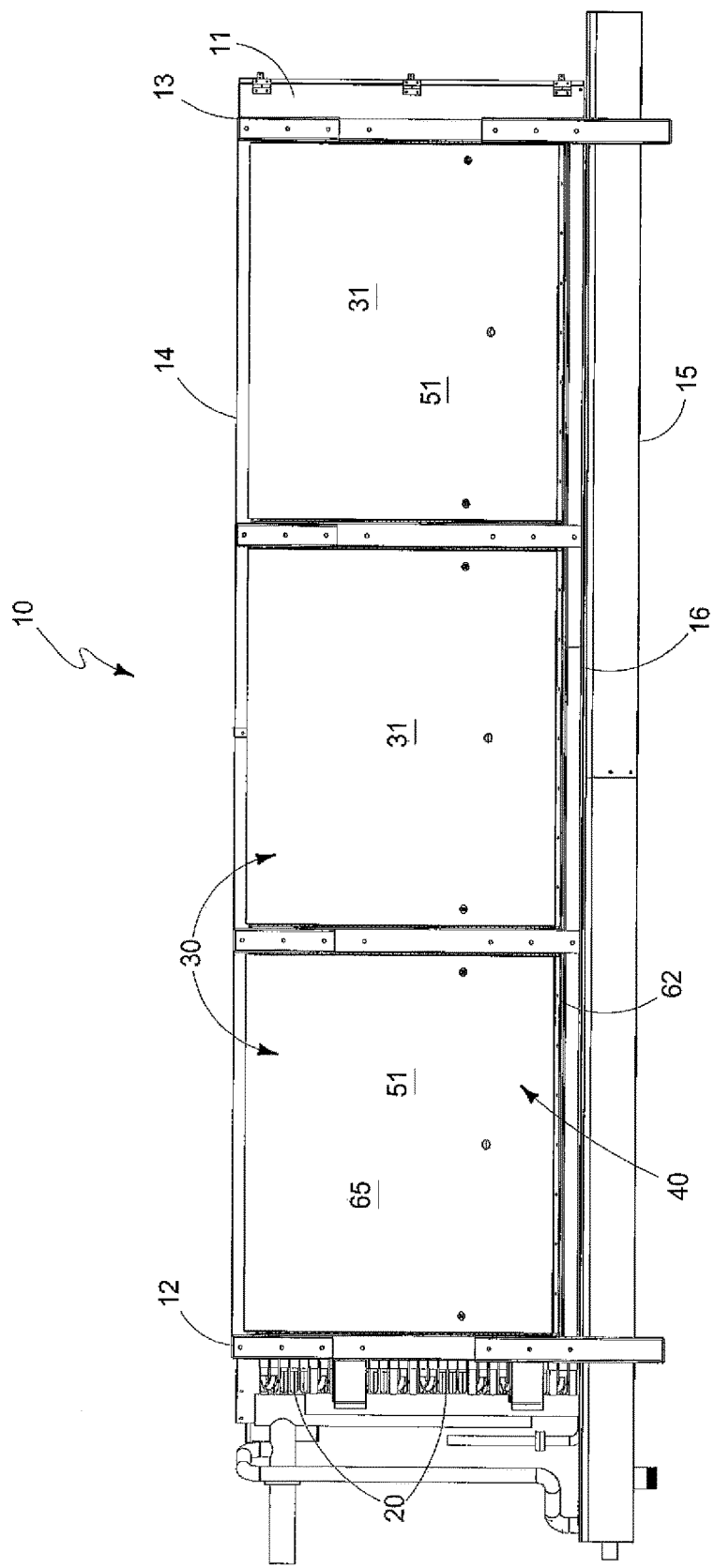
FIG. 3 is a side elevation view of a refrigeration device showing the air hood of the present invention in a functional, or operating orientation.
Figure 6:
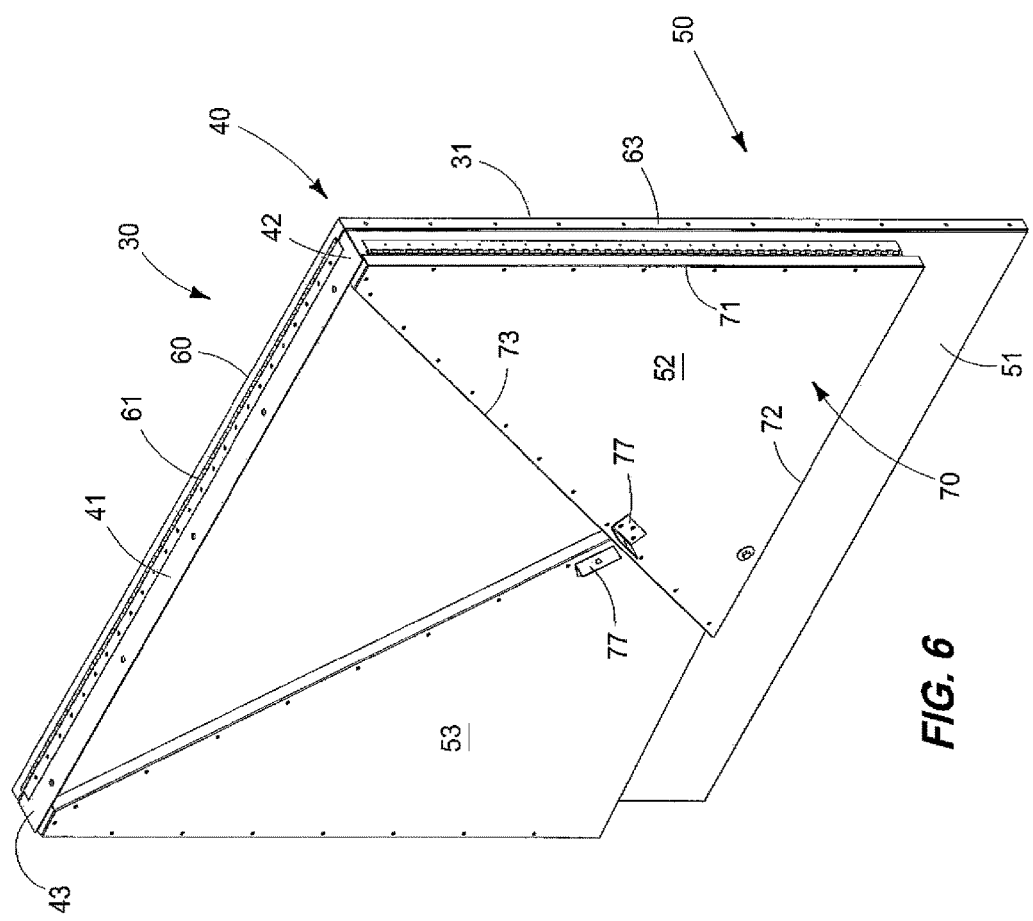
FIG. 6 is a fragmentary, perspective, isometric view of an inoperable air hood of the present invention, and which is shown in a collapsed, non-functional orientation.
Figure 7:
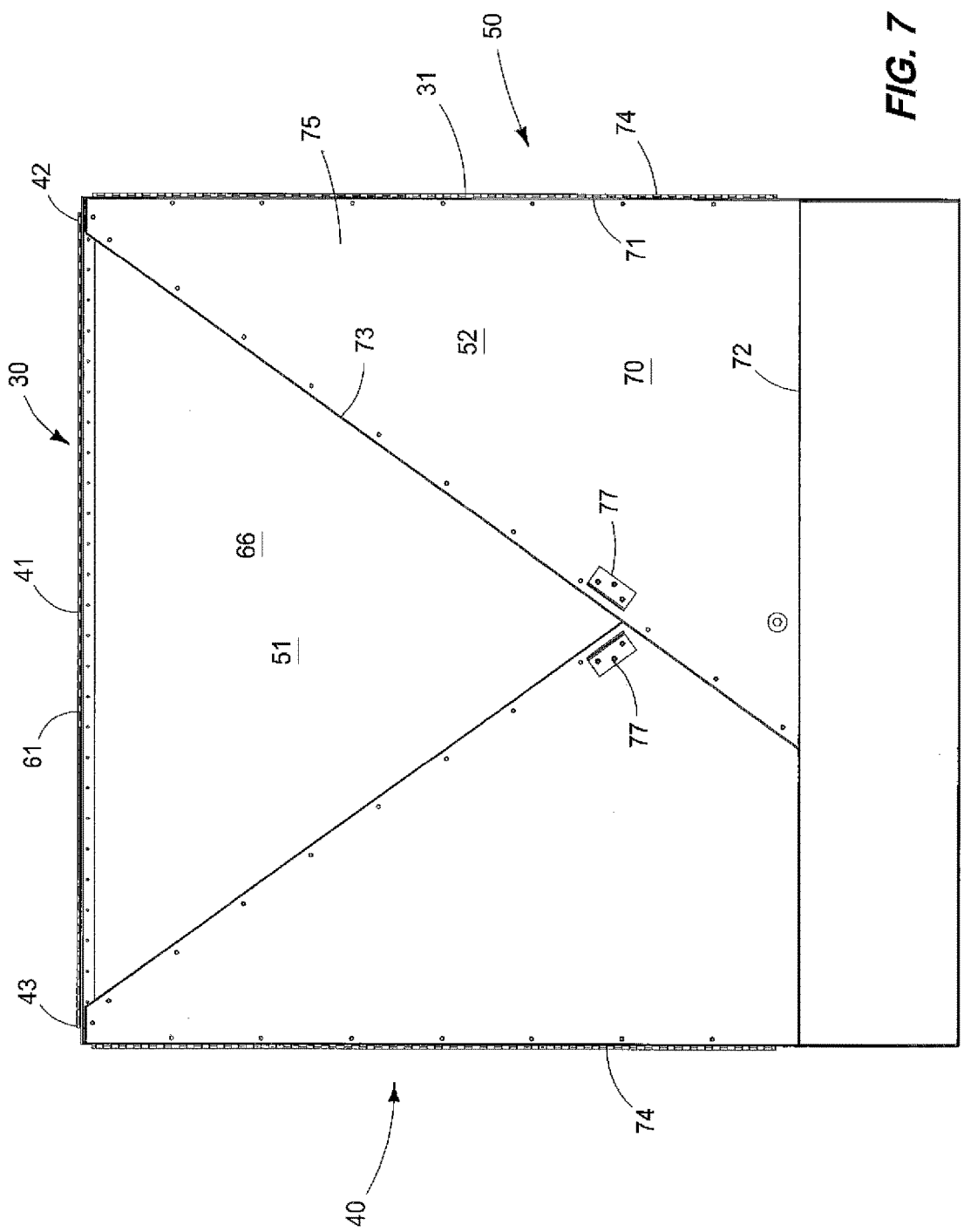
FIG. 7 is a second, side elevation view of an air hood of the present invention, and which is shown in an inoperable or collapsed orientation.

The air hood of the present invention is generally indicated by the numeral 30 in FIG. 1, and following. The air hood 30 of the present invention is moveable between a first position 31, as seen in FIGS. 1A and 3, and wherein the air hood is arranged or positioned in an inoperable or collapsed orientation relative to the air intake site 16 of the refrigeration device 10, and wherein individual panels forming the air hood 30 and which will be discussed, below, are moveable from the first position 31, and where the collapsed or otherwise inoperable air hood 30 is located in juxtaposed, covering, occluding relation relative to the air intake side 16 of the refrigeration device, and further protects the refrigeration fins and/or coils 20 from any damage associated with the shipment and installation of the refrigeration device 10; and a second position 32, as seen in FIG. 1, and wherein the air hood 30 is located in an operational position in which the air hood 30 extends laterally, outwardly, relative to the air intake side 16 of the refrigeration device 10, and further allows access to the air intake side 16 of the refrigeration device. The air hood 30 as seen in the second position 32, exposes the refrigeration coils, and/or fins 20. As best seen by reference to FIGS. 6 and 7, and when the respective panels, as will be discussed, below, and which form the air hood 30 are located in the first operational position 31, the respective panels are located in a substantially parallel relationship, one relative to the others and juxtaposed relation relative to the refrigeration device 10, and in covering relation relative to the air intake side 16 thereof.

The air hood 30 has a main body which is generally indicated by the numeral 40. The air hood also includes a frame that is generally indicated by the numeral 41. The frame as seen in the drawings includes a top or uppermost portion or member having a first end 42, and an opposite second end 43. The frame or top portion thereof 41 is affixed to the air intake side 16, and is operable to position a portion of the main body of the air hood 30 in a location which is spaced laterally, outwardly, relative to the first air intake side 16 so as to effect or facilitate a collapsing of the panels, as will be discussed, below, and which form the operational air hood 30 so that they may be placed in the first inoperable collapsed position 31 which places the air hood 30 in substantially covering relation relative to the air intake side 16 of the refrigeration device 10. In the first position 31, the collapsed air hood 30 prevents damage to the refrigeration fins or coils 20 as the refrigeration device is shipped from a manufacturer, and then later installed at a given worksite. Further, the overall size of the refrigeration device is reduced to a minimum. This, of course, reduces any financial charges associated with freight for the product.

The air hood 30 is composed of, and otherwise includes a multiplicity of panels 50, and which are manufactured from a fluid impervious and rigid substrate such as a metal, or the like. The multiplicity of panels include a first or top panel 51 which is hingedly mounted to the frame 41 as earlier disclosed, and further includes a first sidewall 52, and a second sidewall 53 which are hingedly affixed to the first air intake side 16 of the refrigeration device 10. The first and second sidewalls 52 and 53 are disposed in substantially parallel, spaced relation, one relative to the other, and further extend generally perpendicularly downwardly relative to the opposite, first and second ends 42 and 43 of the frame 41. Each of the panels has a main body 54 which defines in this first form of the invention, an internal cavity 55. The internal cavity is typically, substantially fluid impervious and further encloses an insulative material 56. The respective panels are constructed in a manner so as to impede water vapor which is derived from the source of air being heated during the defrost cycle from condensing within the internal cavity 55, and then being absorbed by the enclosed insulative material 56. The insulated panels 50, when located in the second position 32, captures at least a portion of the heat generated during the defrost cycle, and further are effective in reducing the duration of the defrost cycle when located in the second position 32.

The first or top panel 51 is defined, at least in part, by a top peripheral edge 60. A continuous hinge 61 is attached to the top peripheral edge 60, and further is coupled to the frame 41, and thereby renders the first or top panel 51 pivotally moveable relative to the first, air intake side 16 of the refrigeration device 10. Still further the first or top panel 51 has a bottom, peripheral edge 62, which is generally parallel to and disposed in spaced relation relative to the top peripheral edge 60. Moreover, the first or top panel 51 has a first and second laterally disposed peripheral edges 63 and 64, respectively, and which are typically disposed in predetermined, substantially parallel, spaced relation one relative to the other. The first or top panel 51 further has an outside facing surface 65, and an opposite, inside facing surface 66. As seen in FIG. 1, and following, individual apertures 66 and 67, respectively, are formed in predetermined, spaced relation relative to the first and second laterally disposed peripheral edges 63 and 64, and are operable to receive, or cooperate with, a fastener which secures the respective first and second sidewalls 52, and 53, in a given orientation relative to the first and second laterally disposed peripheral edges 63 and 64, as will be discussed, below.

The multiplicity of panels 50, as earlier disclosed, include first and second polygon-shaped sidewalls 52 and 53, respectively. The respective sidewalls 52 and 53 are shown in the drawings as being triangular shaped, although other shapes would work with an equal degree of success. With regard to the sidewalls as seen in the drawings, the respective sidewalls 52 and 53 have a first peripheral edge portion 71, a second peripheral edge portion 72, and a third peripheral edge portion 73. The triangular shaped sidewalls further include a continuous piano-type hinge, here illustrated with the numeral 74, and which attaches the first portion of the peripheral edge portion 71 of each of the sidewalls to the first air intake side 16 of the refrigeration device 10. As those skilled in the art would appreciate, the respective first and second sidewalls 52 and 53 of each of the air hoods 30, are located on opposite sides of apertures which are formed or defined in the first air intake side 16 of the refrigeration device 10. These apertures allow access to the internal cavity thereof, and wherein the refrigeration fins and/or coils 20 remain located adjacent to these individual apertures, not shown. Each of the first and second sidewalls 52 and 53 have an outside facing surface 75, and an opposite, inside facing surface 76. As seen in the drawings, a right-angle bracket 77 is mounted or fixed to the inside facing surface 76 of the respective first and second sidewalls 52 and 53. The right-angle bracket 77 is operable to receive or cooperate with a fastener 78. The fastener passes through the aperture 67 which is formed in the top panel 51 and thereby secures the top panel to the respective first and second sidewalls 52 to 53 to form a rigid, outwardly extending and operational air hood 30 which is located in the second position 32. When appropriately reconfigured, and placed in an operational condition 32 as seen in the drawings, the first or top panel and the first and second sidewalls 52 and 53 define a resulting hood opening 80 which allows access to the refrigeration fins and/or coils 20 which are enclosed within the refrigeration device 10. The air hood 30 as shown in the second position 32 facilitates a defrost cycle, and minimizes the duration of the defrost cycle. The air hood 30 further increases the effectiveness thereof. Yet further, because the individual air hoods 30 can be collapsed or otherwise reconfigured so that they may be placed into the first position 31,(FIGS. 3, 6, and 7), the resulting refrigeration device 10 has smaller outside dimensions than a refrigeration device 10, and which has an operational air hood. This can be seen by a comparison of FIG. 1A and FIG. 1, respectively, Consequently, associated freight and shipping charges, as well as problems associated with the installation of the refrigeration device 20 at a given worksite are substantially reduced.

Figure 5:
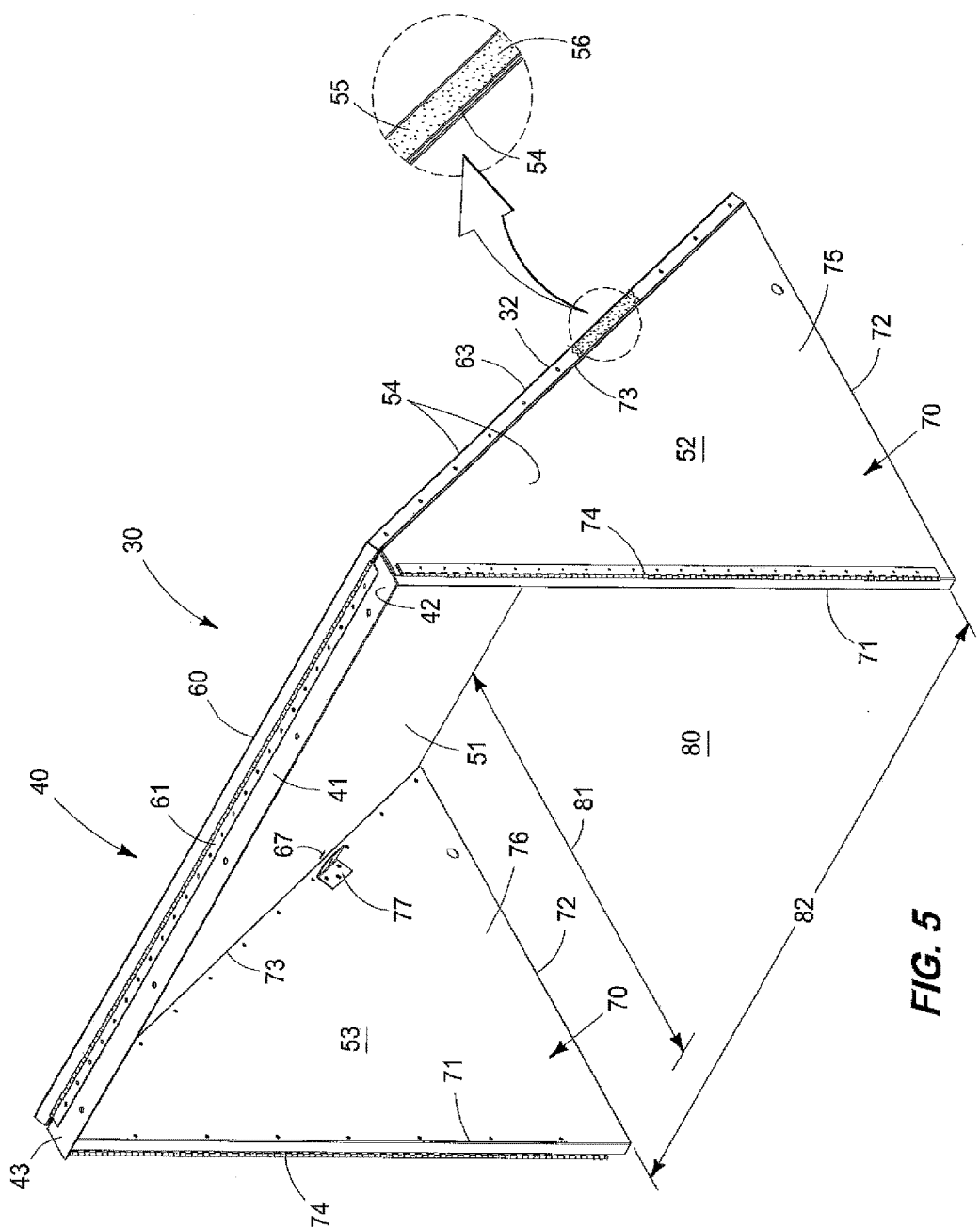
FIG. 5 is a fragmentary, perspective, isometric view of an operational air hood of the present invention.
Figure 5A:
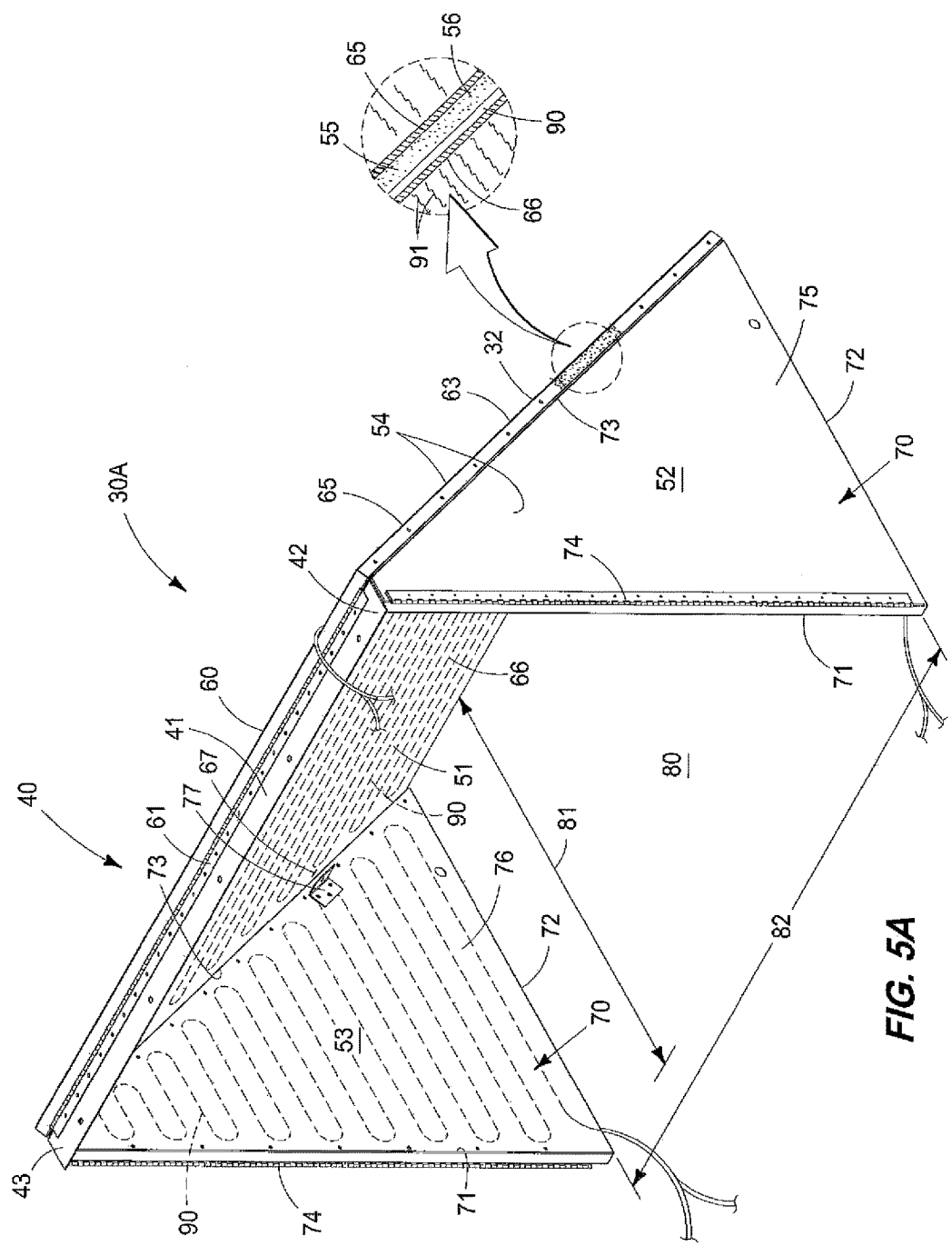
FIG. 5A is a fragmentary, perspective, isometric view of a second form of an operational air hood of the present invention.

A second form of the air hood is best seen by reference to FIG. 5A and is indicated by the numeral 30A. All other common structures will utilize the same numerals as employed in the earlier mentioned form of the invention. As seen in this second form of the invention, the air hood 30A includes a heating element 90, which is shown in hidden lines, and which is further received within the internal cavity 55 of each of the respective panels 50, and is also located or oriented in heat transmitting relation relative to the inside facing surfaces 66, and 76 respectively. The heating element 90 is selectively energized during the defrosting cycle so as to heat 91, the inside facing surface 66 and 76. This heating 91 impedes the condensation of water onto the inside facing surfaces, and which is derived from the source of air 22 being cooled. This prevents liquid water from being generated, and which enters the space being cooled, and which can then later form ice when the defrosting cycle is completed. By heating the inside facing surfaces 66, and 76, this condensation is impeded, and the build-up of any ice in the space being cooled is avoided.

OPERATION

The operation of the described embodiment of the present invention is believed to be readily apparent, and is briefly summarized at this point.

In its broadest aspect, the present invention relates to an air hood 30 which operates in combination with a refrigeration device 10, and where the refrigeration device has an air intake side 16, and which further encloses refrigeration fins and/or coils 20. The refrigeration fins or coils when rendered operational, are operable to reduce the temperature of a source of air 21 which requires cooling, and wherein the refrigeration fins and/or coils 20 are located adjacent to the air intake side 16. The invention also includes a frame 41, and which is mounted on the refrigeration device 10, and which further circumscribes, at least in part, the air intake side 16 of the refrigeration device 10. The invention 30 further includes a multiplicity of panels 50. Each of the panels have a peripheral edge, and wherein each panel 50 is further hingedly mounted along at least a portion of their respective peripheral edges to the air intake side 16 of the refrigeration device 10, and are further moveable from a first position 31, and wherein the respective panels in the first position are each located in juxtaposed, covering relation relative to the air intake side 16 of the refrigeration device 10, and further protect the refrigeration fins and/or coils 20 from any damage associated with the shipment and installation of the refrigeration device 10; and a second position 32, and wherein the respective panels 50, when located in the second position 32 are moved to a given, laterally outwardly disposed orientation relative to the refrigeration device 10, and further matingly cooperate with each other so as to define an operational air hood 30 which allows access to the air intake side 16 of the refrigeration device 10, and which further exposes the refrigeration coils and/or fins 20.

As previously discussed, the refrigeration device 10 has a well-known defrost cycle, which generates heat. During the defrost cycle, the air hood 30 captures, at least in part, some of the heat which is generated by the defrost cycle. Still further in the arrangement as shown, and as disclosed in the present patent application, the respective panels 50 are fabricated in a manner so as to be insulated, and are further operable to impede the condensation of a source of gaseous water, which is derived from the source of air 21, and which is being heated during defrost cycle by the refrigeration device 10. In the arrangement as seen in the drawings, the respective multiplicity of panels 50 are affixed together along at least one of their peripheral edges, to an adjoining panel, by means of a fastener 78. As should be understood, the respective panels 50 when located in the first position 31, are located in a substantially parallel relationship, one relative to the other, and in juxtaposed relation relative to the refrigeration device 10, and further in covering relation relative to at least a portion of the air intake side 16 thereof. In the arrangement as seen in the drawings, the respective panels 50 each define a substantially sealed internal cavity 55 which encloses an insulative material 56. The respective panels 50 impede water vapor which is derived from the source of air 21 which is being heated during defrost cycle from condensing within the internal cavity 55, and being absorbed by the enclosed insulative material 56. As earlier noted, the refrigeration device 10 has given outside dimensions, and wherein the respective panels 50 when located in the first position 31 does not significantly increase the outside dimensions of the refrigeration device so as to reduce freight costs, and further facilitates the handling and installation of the refrigeration device 10. Still further the air hood 30 of the present invention is effective to enhance a defrost cycle, and remove any accumulated frost which is formed on the refrigeration fins and/or coils 20 of the refrigeration device 10 when the refrigeration device is operational. The air hood 30 further increases the effectiveness, and reduces an overall elapsed time of the defrost cycle.

In the arrangement as seen in the drawings, the respective panels 50, when located in the second position 32, define a hood opening 80, which has a depth dimension 81, and which is about 75% of the height dimension, of the refrigeration fins and/or coils 20, and about the same width dimension 82 as the refrigeration fins and/or coil and which are located adjacent to the air intake side 16 of the refrigeration device 10.

Therefore it will be seen that the air hood 30 of the present invention provides many conveniences and advantages not available with the prior art practices utilized heretofore. The invention is easy to use, convenient to install and is easy to place into operation.

In compliance with the statute, the invention has been described in language more or less specific as to structural and methodically features. It is to be understood, however, that the invention is not limited to the specific features shown and described since the means herein disclosed comprise preferred forms of putting the invention into effect. The invention is, therefore, claimed in any of its forms or modifications within the proper scope as appropriately interpreted in accordance with the Doctrine of Equivalence.

We claim:

1. A reconfigurable air hood comprising:
   a refrigeration device having a main body with opposite first and second ends, a top surface, an opposite bottom surface, a first air intake side and an opposite second side, the first air intake side of the main body defining a plurality of spacedly arrayed air intake apertures, and the main body enclosing a plurality of refrigeration coils between the first air intake side and the opposite second side, at least some of the plurality of refrigeration coils immediately adjacent to the first air intake side and immediately adjacent the plurality of spacedly arrayed air intake apertures;
   a fan on the second opposite side of the main body that when energized is operable to draw a source of air into and through the plurality of air intake apertures defined in the first air intake side of the main body and to draw the source of air through the main body and around and about the plurality of refrigeration coils and out through the second opposite side of the main body;
   a frame having a first end and a second end, the frame affixed to the main body on the air intake side and adjacent one of the plurality of air intake apertures;
   a plurality of hingedly movable planar, fluid impervious panels forming the reconfigurable air hood, each of the plurality of hingedly movable panels defining an internal cavity that encloses insulative material, the plurality of hingedly movable panels including,
      a top panel having a top peripheral edge, a bottom peripheral edge and spaced apart first and second laterally disposed peripheral edges, the top peripheral edge having a continuous hinge that is coupled to the frame to permit the top panel to pivot between a first position occluding the air intake aperture adjacent the frame and protecting the plurality of refrigeration coils, and a second extended operable position wherein the bottom peripheral edge is spaced apart from the adjacent air intake aperture and spaced apart from the plurality of refrigeration coils,
      first and second polygon-shaped side walls, each of the first and second polygon-shaped sidewalls having a first peripheral edge, a second peripheral edge and a third peripheral edge, the first peripheral edge of each of the first and second polygon-shaped sidewalls each having a continuous hinge which pivotally affixes the respective first and second polygon-shaped sidewalls to the first air intake side of the main body adjacent the first and second laterally disposed peripheral edges of the top panel and adjacent laterally the air intake aperture, each of the first and second polygon-shaped sidewalls pivotal between a first position partially occluding the adjacent air intake aperture, and a second extended operable position substantially perpendicular to the air intake side of the main body, the second peripheral edge of each of the first and second polygon-shaped sidewalls each configured to releasably engage with the adjacent spaced apart first and second laterally disposed peripheral edges of the top panel, and the top panel and the first and second polygon-shaped sidewalls are parallel and at least partially overlapping when the top panel and the first and second polygon-shaped sidewalls are each in the first occluding position, and the top panel is generally perpendicular to the two polygon-shaped sidewalls when the top panel and the first and second polygon-shaped sidewalls are in the second extended operable position; and
   a fastener that releasably secures the respective first and second polygon-shaped sidewalls to the first and second laterally disposed peripheral edges respectively of the top panel when the reconfigurable air hood is in the second extended operable position.

2. A reconfigurable air hood, as claimed in claim 1, and wherein the refrigeration device has a defrost cycle, which generates heat, and wherein the reconfigurable air hood, when positioned in the second extended operable position captures, at least in part, some of the heat which is generated by the defrost cycle.

3. A reconfigurable air hood, as claimed in claim 2, and wherein the respective plurality of hingedly movable planar fluid impervious panels are fabricated so as to be insulated, and are further operable to impede the condensation of a source of gaseous water, and which is derived from the source of air which is being heated by the refrigeration device during the defrost cycle.

4. A reconfigurable air hood, as claimed in claim 3, and wherein the respective plurality of hingedly movable planar fluid impervious panels are releasably affixed together along at least one of their respective peripheral edges to an adjoining panel by means of a releasable fastener.

5. A reconfigurable air hood, as claimed in claim 4, wherein the respective plurality of hingedly movable planar fluid impervious panels when located in the first occluding position, are located in a substantially parallel relationship, one relative to the other, and in juxtaposed covering relation relative to the adjacent air intake aperture of the refrigeration device.

6. A reconfigurable air hood, as claimed in claim 5, and wherein the respective plurality of hingedly movable planar fluid impervious panels each define a substantially sealed, internal cavity, and which encloses insulative material, and wherein each of the respective plurality of hingedly movable planar fluid impervious panels impede water vapor which is derived from the source of air being heated during the defrost cycle from condensing within the internal cavity, and being absorbed by the enclosed insulative material, and wherein the respective plurality of hingedly movable planar panels are each fabricated from a substantially water impervious substrate.

7. A reconfigurable air hood, as claimed in claim 6, and wherein the refrigeration device has given outside dimensions, and wherein the respective plurality of hingedly movable planar fluid impervious panels, when located in the first occluding position, do not significantly increase the given outside dimensions of the refrigeration device so as to reduce freight costs, and further facilitates the handling and installation of the refrigeration device.

8. A reconfigurable air hood, as claimed in claim 7, and wherein the defrost cycle is effective to remove an accumulated frost, which is formed on the refrigeration coils of the refrigeration device when the refrigeration device is operational, and wherein the reconfigurable air hood increases the effectiveness of the defrost cycle, and reduces an overall elapsed time of the defrost cycle.

9. The air hood as claimed in claim 1, and wherein a heating element is positioned within the internal cavity of the respective panels, and is located in heat transferring relation relative to the inside facing surface of the panels forming the operational air hood.

10. A reconfigurable air hood, comprising:
a main body which is attached to a refrigeration device having an air intake side, and wherein the refrigeration device has refrigeration coils, which are positioned adjacent to the air intake side, and which further periodically require defrosting by undergoing a defrost cycle which generates heat, and wherein the main body of the air hood is reconfigurable, and moveable from a first, collapsed occluding position, and wherein the main body is oriented so as to cover and substantially occlude an air intake aperture defined in the air intake side of the refrigeration device so as to reduce an dimensional size of the refrigeration device, and minimize freight expenses for shipping the refrigeration device to an installation site, and which further protects the refrigeration coils during shipment and installation, and wherein the main body of the reconfigurable air hood, when moved to a second extended operable position, forms a rigid operational air hood structure, which extends laterally, outwardly relative to the air intake side of the refrigeration device, and which further defines a hood opening that allows access to the air intake aperture of the refrigeration device, and wherein the hood opening has a predetermined cross-sectional dimension, and wherein the main body, when located in the second extended operable position, captures, at least in part, a portion of the heat generated during a defrost cycle, and further reduces a duration of the defrost cycle, and additionally increases the efficiency of the defrost cycle.

11. A reconfigurable air hood as claimed in claim 10, and wherein the main body of the reconfigurable air hood has a frame which attaches to the air intake side of the refrigeration device, and wherein the frame includes a top portion having opposite ends, and the frame is positioned adjacent an air intake aperture.

12. A reconfigurable air hood as claimed in claim 11, and wherein the main body of the air hood includes a top panel having a top peripheral edge which is hingedly mounted to the top portion of the frame, and wherein the top panel further includes a pair of laterally disposed peripheral edges, and a bottom edge; and wherein the main body further includes a pair of hingedly moveable, polygon-shaped side walls which have a first peripheral edge which is hingedly mounted to the air intake side of the refrigeration device, and which further supportingly cooperates with the top panel so as to form a resulting, and operational air hood which extends laterally outwardly relative to the refrigeration device, and which further exposes the air intake side of the refrigeration device.

13. A reconfigurable air hood as claimed in claim 12, and wherein the respective sidewalls are triangular shaped, and the top panel is releasably affixed to the respective side walls by means of a fastener.

14. The air hood as claimed in claim 12, and wherein the top panel, and individual side walls each define an internal cavity, and further have an outwardly and an inwardly facing surface, and wherein a heating element is located in the interior cavity of the top panel and individual sidewalls, and is maintained in heat transmitting relation relative to the inside facing surface, and wherein during the defrost cycle the heating element is energized so as to heat the inside facing surfaces so as to impede the condensation of water on the inside facing surface during the defrost cycle.

* * * * *